May 3, 1938.  E. F. WATSON  2,115,894
APPARATUS AND METHOD FOR THE ELECTRICAL TRANSMISSION OF PICTURES
Filed Dec. 15, 1923

INVENTOR
E. F. Watson
BY
ATTORNEY

Patented May 3, 1938

2,115,894

UNITED STATES PATENT OFFICE 2,115,894

APPARATUS AND METHOD FOR THE ELECTRICAL TRANSMISSION OF PICTURES

Edward F. Watson, Larchmont, N. Y., assignor to American Telephone and Telegraph Company, a corporation of New York Application December 15, 1923, Serial No. 681,006

31 Claims. (Cl. 178—6.7)

The principal object of my invention is to provide a new and improved method and suitable apparatus for analyzing a picture into its elements and transmitting a succession of electrical currents of such character that from them the picture can be reproduced at the receiving end. Another object of my invention is to analyze a picture into its elements, transmit code impulses corresponding to the degree of light and shade of the elements, and from these impulses at the receiving end to reconstruct the picture. Another object of my invention has relation to economizing the line time for a sequence of elements of the same shade. These and various other objects of my invention will become apparent on consideration of a specific embodiment which is disclosed in the following specification and the accompanying drawing. It will be understood that the invention is defined in the appended claims and that the following description relates to the particular embodiment here presented by way of illustration.

Figure 1:
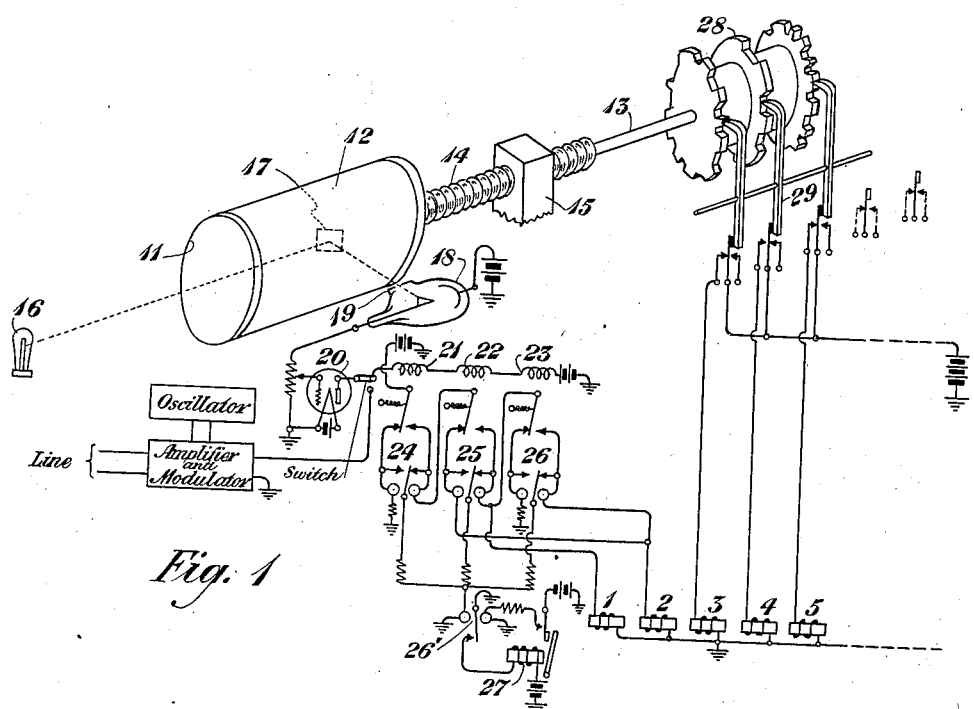
Figure 2:
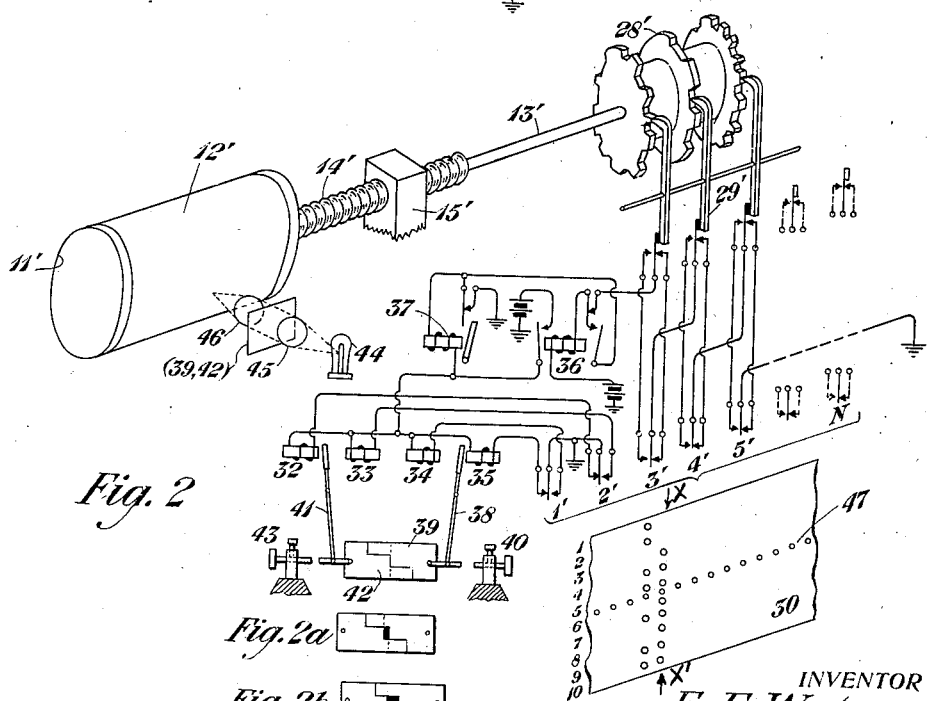
Figure 2A:
Figure 2B:
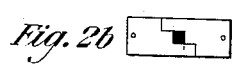
Figure 2C:

Referring to the drawing, Figure 1 is a diagram of the transmitting apparatus, Fig. 2 is a diagram of the reproducing apparatus at the receiving end, and Figs. 2a, 2b and 2c are details of a light valve at the receiving end.

The semi-transparent negative picture film 12 is wrapped on the glass drum 11 at the transmitting end, which is rotated step-by-step and at the same time advanced slowly in an axial direction by the screw threads 14, engaging the stationary rack 15. The shaft 13 that carries the glass drum 11 and the screw 14 also carries 8 notched discs 28, of which only three are shown in the drawing. These will be discussed later herein.

From the light source 16 a ray of light is directed to the oblique mirror 17 within the drum 11 and from there reflected in a radial direction through the opening in the screen 19 to the photoelectric cell 18.

Relatively to the film 12, the spot thereof intersected by the beam of light from the mirror 17 to the photoelectric cell 18 describes a helical course, and the light falling on the cell 18 varies in intensity according to the degree of light and shade of the successive picture elements along such a course. The current through the photoelectric cell 18 determines a corresponding voltage on the grid of the three-electrode vacuum tube amplifier 20. The output current from the amplifier 20 goes through the three marginal relays 21, 22 and 23 in series. For that shade of the film 12 corresponding to black, the output current from the amplifier 20 will be too low to affect any one of the marginal relays 21, 22 or 23. The shade dark gray will give an increased current such that relay 21 only will pick up. On light gray both 21 and 22 will pick up but not 23. For the shade corresponding to white light all three relays 21, 22 and 23 will pick up. The circuits controlled by the relays 21, 22 and 23 are shown plainly in Fig. 1 so they may be traced in connection with the following description of the operation of the apparatus. It should be understood that in the polar relays 24, 25 and 26, current in the left winding will throw the armature to the right and vice versa. On the other hand, current through the left winding of relay 26' throws its armature to the left and vice versa. In all four relays 24, 25, 26 and 26' the armature will remain on that side in which it was left by a current impulse until a current impulse of opposite effect passes through the windings.

As shown in Fig. 1, the relay system is in the condition for a successon of black elements on the film 12. Suppose that a dark gray element succeeds in location opposite the opening in the screen 19. The resulting increased output current from the amplifier 20 will operate the relay 21, closing momentarily a circuit for current from battery through armature of relay 24 and relay 26' to ground. Through a parallel circuit, current will also flow through the right-hand winding of relay 24 and the left-hand winding of relay 25 and selector magnet 2 to ground, and the consequent operation of relay 24 will cut off the current after a momentary flow to relay 26', leaving the relays 24 and 25 and the selector magnet 2 operated.

The operation of relay 26' closes a circuit for the punch magnet 27, which causes to be punched in a tape whatever combination is set up at the time in the selector magnets 1 to 10, of which 1 to 5 only are shown in Fig. 1. It will be seen that the punch magnet 27 is arranged so that after it operates it closes a restoring circuit for the punch relay 26'.

As long as picture elements follow of the dark gray shade, there will be no further operation of the relay system and an examination of the circuits of the relays shows that the punch relay 26' is operated only when there is a change in the relays 24, 25 and 26 and that there is such a change only when there is a change in the marginal relays 21, 22 and 23. When the picture shade changes to black, neither selecting magnet 1 or 2 is actuated and hence for these two positions on the tape there will be blanks. When the shade changes to dark gray, selecting magnet 2 only will be actuated and the first position will be a blank and the second will have a hole punched. In this way the four different shades are indicated by the four different possible combinations obtained with the selector magnets 1 and 2 as shown in the following table. For convenience, the table is also made to include receiving end data, to which reference will be made hereafter in this specification.

| Sending equipment | | | | Receiving equipment | | | |
| --- | --- | --- | --- | --- | --- | --- | --- |
| Shade of sending film | Marginal relays operated | Selector magnets operated | Code; ( )= "blank" | Selector contacts operated | Light valve magnets operated | Size of operating in light valve | Shade of receiving film |
| Black | None | None | ( )( ) | None | 32, 35 | Closed | White |
| Dark gray | 21 | 2 | ( ) 0 | 2' | 33, 35 | Small | {Light gray |
| Light gray | 21, 22 | 1 | 0 ( ) | 1' | 32, 34 | Medium | {Dark gray |
| White | All | 1, 2 | 0 0 | 1', 2' | 33, 34 | Large | Black |

Each angular step of the drum 11 is 1/250 of a complete revolution. Thus, if the dimension of the film corresponding to the circumference of the drum 11 is five inches, this will make 50 elements per circumferential inch on the film 12. The eight notched discs 28, of which only three are shown in Fig. 1, give 256 (=2⁸) different combinations in positioning the levers 29. Hence, the closure of the circuits of the magnets 3 to 10 (of which only 3 to 5 are shown) will be in accordance with a distinctive combination for each of the 250 angular positions of the drum 11. The combination in the selector magnets 3 to 10 changes at each successive step of rotation of the drum 11 but it must be remembered that the punch magnet 27 is operated only when the film shade code changes so that while the film shade remains the same no record is punched in the tape, but whenever the film shade changes a record is punched in the tape for which the magnets 1 and 2 indicate the particular shade to which the change is made and the magnets 3 to 10 indicate the position of the drum at which that change occurs.

The prepared tape at the sending end is fed through a transmitter just the same as for a printing telegraph and at the receiving end a similar tape is punched out automatically. A section of such a tape is shown at the lower right in Fig. 2, where the corresponding positions number across from 1 to 10. The holes and blanks at positions 1 and 2 indicate the shade to which a change is to be made and the holes and blanks at positions 3 to 10 indicate a particular angular position at which the change is to be made.

At the receiving end a drum 11' carries a sensitive receiving film 12' and is rotated by means of a spline connection to the shaft on which it is carried and which is in turn rotated by any suitable power means, not shown. The shaft 13', carrying the drum 11' also carries a screw 14', engaging a stationary rack 15', as at the transmitting end. The shaft 13' also carries a set of eight notched discs 28', like those designated 28 at the sending end, each disc 28' controlling a contact through a respective lever 29'.

As the receiving film 12' is rotated and advanced slowly along its axis its successive elements in helical order pass under the focal point of the rays of light from the source 44 through the lenses 45 and 46. A light valve is indicated symbolically by the reference characters (39, 42) and the same light valve is shown structurally at 39, 42 elsewhere in Fig. 2.

The tape 30 which has been automatically perforated at the receiving end, is placed in a tape transmitter of same type used at the sending end in which the respective ten code positions 1 to 10 in the tape, control 10 contacts 1' to 10' of which 1' to 5' only are shown. This type of transmitter is well known in the printing telegraph art. The tape is interpreted one transverse set of holes at a time, the particular set which is effective in Fig. 2 being indicated by X—X'. A hole in the tape such as in position 3 results in corresponding contact 3' being closed to the right, while the lack of a hole such as in position 1 results in corresponding contact 1' being closed to the left. The tape is stepped forward from one row of transverse holes to the next by the action of tape feed magnet 37, which rotates a sprocket wheel engaging feed holes 47 in the tape.

As the drum 11' is rotated, the tape 30 stands still until the cams 28' come to the effective position corresponding to the particular tape combination 3 to 10 which is effective at the time. At this position the setting of the contacts 29' will correspond to the setting of contacts 3' to 10', closing the circuit for the relay 36 from battery through the relay and the contacts 29' and 3' to 10' in series, to ground. The energizing of relay 36 will close the circuit for and actuate tape feed magnet 37 to advance the tape 30 one step and also will close the circuits of whichever magnets 32, 33, 34 and 35 are determined by the holes 1 and 2 in the tape and the consequent shifting of the contacts at 1' and 2'. In accordance with the foregoing table taken in connection with Fig. 2 it will be seen that the blanks or holes at the two positions 1 and 2 in the tape 30 determine four combinations for the levers 38 and 41, controlled by the magnets 32, 33, 34 and 35. The stops 40 and 43 are adjusted so that when magnet 33 acts on lever 41 the light valve 42 opens only to the position shown in Fig. 2a. On the other hand, with 41 at the closed position, as shown in the drawing, when magnet 34 acts on lever 38, the shutter 39 opens to a wider opening as indicated in Fig. 2b. If both levers 41 and 38 are actuated against the respective stops 43 and 40 the opening will be the sum of the openings of Fig. 2a and Fig. 2b, as shown in Fig. 2c.

Thus, the film 12' has each of its elements exposed to one of four degrees of light corresponding to the four degrees of light and shade in the negative picture film 12. Thus the exposed film 12' is a positive corresponding to the negative on film 12.

After an adjustment of the light valve 39, 42, as described, it remains at the same adjustment while the drum 11' is rotated step-by-step until the notched discs 28' come to a combination the same as that recorded in the holes 3 to 10 of the tape 30. Then, as described, the light valve is changed accordingly and the tape 30 is advanced another step.

If necessary, a line of distinctive shade may be ruled along a margin of the picture at the sending station, so that this line will be parallel to the axis of the sending drum. This will insure that a code combination will be punched in the tape at least once for each revolution of the sending drum, and the possibility of confusion due to a sequence of elements of like shade extending more than once round the drum will be avoided.

I claim:

1. The method of electrical transmission of a picture which consists in testing successive elements of the picture to be transmitted and sending a code signal only at every change of shade to indicate the shade and the position at which the change occurs.

2. The method of electrical transmission of a picture which consists in testing successive elements of the picture in helical course and sending a characteristic current combination only when the shade changes between two successive elements to indicate the degree of shade and the angular position at which the change occurs.

3. The method of electrical transmission of a picture which consists in testing the shade of successive elements of the picture to be transmitted and sending a code signal only at every change of shade to indicate the shade and also to indicate the position where the change occurs relatively to a constantly fixed datum in the picture.

4. The method of electrical transmission of a picture which consists in bending the picture to a cylindrical shape, testing the shade of successive elements along a helical course thereof, and sending a code signal only at every change of shade to indicate the shade and the angular position of the picture at which the change occurs.

5. The method of electrical transmission of a picture, which consists in testing the shade of successive elements of the picture along successive lines across it, and sending a code signal only at every change of shade to indicate the shade and the location in the line at which the change occurs.

6. In combination, a drum with a film thereon, means to punch a tape with a distinctive set of holes when there is a change of shade in successive elements of the drum in helical order thereon to indicate the shade and the angular position at which the change occurs, means to reproduce corresponding holes in a tape at the receiving end, and means to reproduce the successive elements of the picture in order governed by such a tape at the receiving end.

7. A drum, means to rotate it on its axis and traverse it slowly along its axis so that a stationary point beside it will describe a helical path on the surface of the drum, a plurality of notched discs carried co-axially by the drum to give different code combinations for each of a number of angular positions of the drum, and electrical circuits controlled by said notched discs.

8. In a picture transmission and receiving system, means for testing successive elements of a picture to be transmitted, means for sending only when a change in shade occurs in the portion of the picture being tested, code signals for different degrees of shade in the picture elements and for the relative positions of said elements, a receiving surface, and means responsive to such code signals to reproduce said elements in their proper shade and also in their proper position on said surface.

9. In a picture transmission and receiving system, means for testing elements of a picture to be transmitted, means for sending only when a change in shade occurs in the portion of the picture being tested, code signals characteristic of the different degrees of shade and characteristic of the different positions of the said elements, a receiving surface, and means for recording said signals to reproduce said elements in their proper shades and positions on said receiving surface.

10. In a picture transmission and receiving system, means for testing elements of a picture to be transmitted, means for recording code combinations each of which is characteristic of both the shade and the position of an elemental area of the picture, means for transferring said record, a receiving surface, and means under control of the transferred record for reproducing said elements in their proper shades and positions on said surface.

11. In a picture transmission system, means for testing successive elements of a picture to be transmitted, a plurality of devices each operated in response to the testing of elements of a particular characteristic, a recording tape, means operated in accordance with the position of the element being tested, and means controlled by the joint setting of said devices and said last mentioned means for punching in said tape only where a change occurs in the characteristic of the picture elements being tested, a record in code form characteristic of the picture element being tested and of its relative position.

12. In an electro-optical image producing system, means for successively scanning elemental areas of a picture or object, means for recording code combinations characteristic of the shades of said elemental areas and for recording other code combinations to indicate the position of the elemental area to which a given shade code combination corresponds.

13. In an electro-optical image producing system, means for successively scanning elemental areas of a picture or object, means for recording code combinations, each of which is characteristic of both the shade of an elemental area of the picture or object and of the position of this elemental area.

14. In combination, a drum with a picture representation mounted thereon, means to punch a tape with a set of holes characteristic of the shade of a given elemental area of a picture, and with a different set of holes characteristic of the angular position of the drum corresponding to the given elemental area.

15. In combination, a drum with a picture representation mounted thereon, means to punch a tape with code combinations, each of which is characteristic of both the shade of a given elemental area of a picture and of the angular position of the drum at which said elemental area occurs.

16. In combination, a drum with a picture representation mounted thereon, means to punch a tape with code combinations, each of said code combinations being characteristic of both the shade of a given elemental area of a picture and of the angular position of the drum at which said elemental area occurs, and means to scan the elemental areas of the picture in order for operating said punching means whenever there is a change in the shade of the elemental areas being scanned.

17. Apparatus for controlling an electrical system for registering variations in shade of a picture or object, comprising an electric circuit, a light sensitive element in said circuit, means for impressing said variations upon said light sensitive element through the action of light, relay means associated with said circuit set to respond to particular values of current intensity, a plurality of output circuits for said relay means, means including said relay means for setting up telegraphic impulses, means for utilizing said impulses to form an intermediate, non-pictorial record of said variations, and light controlling means controlled by said record to form an image of said picture or object.

18. A system for transmitting pictures comprising, a light sensitive means, means responsive to the output thereof for producing an interrupted current having time durations proportional to the light intensity incident upon said means, means for recording the currents upon a perforated tape, and means including an electric signal circuit for reproducing the perforated tape at a receiving station.

19. In combination, a source of code signals, a light valve comprising a plurality of movable light intercepting elements, under control of different units respectively of said code, each of which can be moved to vary the total amount of light transmitted by the valve, and means for moving said light intercepting elements in accordance with said code signals.

20. The combination with a light valve comprising a plurality of movable light intercepting elements each of which can be moved to vary the total amount of light transmitted by the valve, of separate electrically controlled means for said elements respectively, for simultaneously moving said elements under control of code signals.

21. The combination with a light valve comprising a plurality of movable light intercepting elements each of which can be moved to vary the total amount of light transmitted by the valve, of a plurality of electromagnets for controlling the movement of different light intercepting elements respectively, in accordance with the energization thereof, and means under control of code signals for energizing said electromagnets simultaneously.

22. In an image producing system, a source of code signals representing the tone values of successively scanned elemental areas of a field of view, a source of light, a plurality of light intercepting elements, under control of different units respectively of said code, each of which can be moved to vary the total amount of light from said source reaching an image field, and means for moving said elements in accordance with said code signals for controlling the production of an image of said field of view.

23. In combination, means for producing a beam of light, a plurality of electromagnetic devices for acting upon said beam of light to control a characteristic thereof, a source of code signals, and means for energizing different combinations of said electromagnetic devices in accordance with said code signals for correspondingly controlling said characteristic of the light beam.

24. In an image producing system, a record of code telegraph signals representing the tone values of small areas of a picture or other object, an image of which is to be produced, means for producing a beam of light, a plurality of electromagnetic devices, means under control of said electromagnetic devices for intercepting different portions, respectively, of said light beam for controlling a characteristic thereof, and means for causing the energization of different combinations of said electromagnetic devices in accordance with the recorded code signals to control said characteristic of the light beam and thereby the production of an image of said picture or object.

25. In a picture transmission system in which the line current transmitted to a receiving station is varied so that the variations in said line current shall correspond to the varying tone value of successive elemental small areas of a picture or the like which is to be transmitted, means for causing a pencil of light whose intensity varies with the tone value of the consecutive small areas to produce electric pulses of correspondingly varying intensity which are passed through a series of relays of varying sensitiveness to select and close a number of said relays in accordance with the intensity of said electric pulses and current controlling means for controlling the number of relays selected in response to light of a predetermined intensity.

26. An electro-optical image producing system comprising a light sensitive device, means for controlling said light sensitive device to produce an image current having amplitude variations corresponding to the variations in tone value of successive elemental areas of a field of view, an image of which is to be produced, means including a three-electrode vacuum tube having input and output circuits for controlling the selection of a circuit when said image current reaches a predetermined amplitude and means for controlling the biasing potential applied to the input circuit of said vacuum tube for determining the predetermined image current amplitude at which said circuit is selected.

27. A mechanism for producing a non-pictorial record of a picture, comprising the sub-combination of a plurality of marking circuits and a plurality of electrical control devices for said marking circuits for the production of a non-pictorial record in accordance with the degrees of light and shade of a picture, the number of said electrical control devices exceeding the number of said marking circuits.

28. A mechanism for producing a non-pictorial record of a picture, comprising the sub-combination of a plurality of marking circuits, electro-magnetic circuit-closing devices for said marking circuits, the circuit of said electro-magnetic devices including means to automatically transmit electrical current according to the degrees of light and shade in a succession of picture elements so that a series of electrical pulses of varying intensity can be sent through said devices, a pair of said devices being adapted to be individually operated by electrical pulses of different intensity, the operation of either of said pair of devices being adapted to only close a single marking circuit.

29. A mechanism for producing a non-pictorial record of a picture, comprising the sub-combination of a first marking circuit and a second marking circuit, a first electro-magnet having a first switch armature adapted to control the first marking circuit, a second electro-magnet having a second switch armature adapted to control the second marking circuit, said electro-magnets being connected to a circuit which includes means to automatically transmit electrical current according to the degrees of light and shade in a succession of picture elements so that successive current pulses of varying value can be sent therethrough, the first electro-magnet being sufficiently sensitive to operate the first switch armature upon receiving a current pulse of relatively low value, the second electro-magnet being less sensitive so that it is operated to actuate its switch armature only when it receives a current pulse of relatively greater value, each of said switch armatures having a terminal associated therewith, the first switch armature being spaced from its terminal when it is in inoperative position, the second switch armature being connected to the terminal of the first switch armature by conducting means independent of the first switch armature when it is in inoperative position.

30. A mechanism for producing a non-pictorial record of a picture, comprising the sub-combination of a plurality of marking circuits adapted to produce identical markings when closed, said markings being formed in different relative positions on the non-pictorial record-bearer, and electro-magnetic devices of varying sensitiveness adapted to selectively close said marking circuits in accordance with the value of the current pulse passing through said electro-magnetic devices.

31. A mechanism for producing a non-pictorial record of a picture, comprising the sub-combination of a pair of marking circuits having three electro-magnets associated therewith, each of said electro-magnets having a switch-armature associated therewith, each said switch-armature having a terminal associated therewith, said electro-magnets having a circuit provided with means to automatically transmit electrical current according to the degrees of light and shade in a succession of picture elements so that current pulses of varying magnitude can be sent through said electro-magnets, the first marking circuit being directly connected to the first armature associated with said first electro-magnet, said armature being spaced from its terminal when it is in inoperative position, the second marking circuit being connected to the terminal of the second switch-armature, said second switch-armature being connected to the first switch terminal when it is in inoperative position, the third switch-armature being spaced from its terminal when it is in inoperative position, the third switch terminal being connected to the first switch terminal, said electro-magnets having successively decreasing sensitiveness.

EDWARD F. WATSON.